March 23, 1965

V. J. LUNDELL 3,174,441

WAFERING MACHINE

Filed May 23, 1963

INVENTOR.
VERNON J. LUNDELL
BY Wolfe, Hubbard,
Voit & Osann
ATTORNEYS.

March 23, 1965  V. J. LUNDELL  3,174,441
WAFERING MACHINE

Filed May 23, 1963  3 Sheets-Sheet 2

INVENTOR.
VERNON J. LUNDELL
BY Wolfe, Hubbard,
Voit & Osann
ATTORNEY.

March 23, 1965   V. J. LUNDELL   3,174,441
WAFERING MACHINE

Filed May 23, 1963   3 Sheets-Sheet 3

INVENTOR.
VERNON J. LUNDELL
BY Wolfe, Hubbard,
Voit & Osann
ATTORNEYS.

United States Patent Office 3,174,441
Patented Mar. 23, 1965

3,174,441
WAFERING MACHINE
Vernon J. Lundell, Cherokee, Iowa, assignor to Massey-Ferguson Services N.V., Netherlands Antilles, a corporation of Netherlands Antilles
Filed May 23, 1963, Ser. No. 282,625
13 Claims. (Cl. 107—14)

The present invention relates generally to agricultural machines of the type intended primarily for treating forage crops and concerns more particularly improvements in such machines for forming forage crop material into wafers.

Practical mobile wafering machines intended primarily for field operation comprise a relatively recent development in agricultural machinery. These machines are designed not only to include mechanism for compacting forage crop material into wafers but also to include means for picking up the material from the field, chopping it and delivering the co-mingled or homogenized mass of comminuted stems and leaves to the wafering mechanism. Successful wafering is greatly affected by the moisture content of the crop material delivered to the wafering mechanism. Heretofore it has been the practice to allow sun and wind drying until the moisture content has become sufficiently reduced, usually to about twenty percent or less by weight. This practice is consuming of time, involves risk of spoilage and loss of nutrients.

The present invention lies in the provision in a forage crop wafering machine of an improved wafering mechanism including a multiple annular arrangement of die cells of outwardly converging cross section opening from an extruder feed chamber and having rotatable within the chamber pressing means including compacting shoes or skids for engaging comminuted crop material that is distributed about the chamber in juxtaposition with the ends of the die cells to express excess juices from the material and to force the material into and through the cells so as to form it into compact wafers. In the preferred construction the elements of the wafering mechanism that define the die cells are so constructed and arranged that the cells are inclined in the direction of rotation of the compressing means at an acute angle with respect to the radii of the annular arrangement of die cells. The invention also contemplates the collection of juices pressed from the crop material and the provision of means which not only assists in urging the compacting shoes or skids into crop engaging position but which also is effective to release the same when an overload condition is encountered as, for example, when a stone or other obstacle might find its way into the extruder feed chamber.

An example of a wafering machine and mechanism embodying the present invention is shown by way of illustration in the accompanying drawings, in which.

While the invention is illustrated and described in connection with a particular embodiment, it is not thereby intended that the invention be limited specifically to that embodiment. On the contrary, it is intended to embrace all modifications and alternative constructions falling within the spirit and scope of the invention as expressed in the appended claims.

Figure 1:
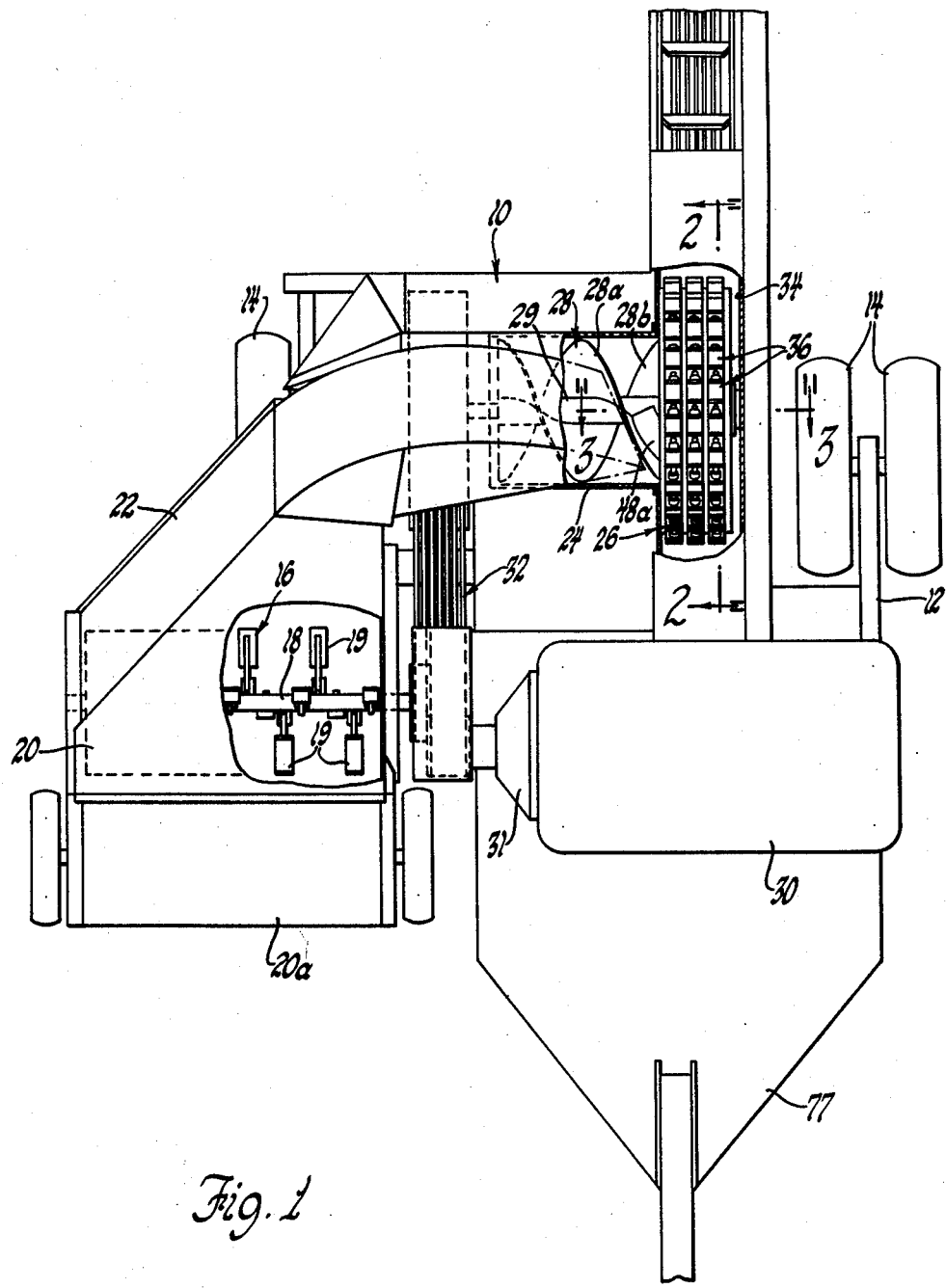
FIGURE 1 is a top plan view of the illustrative machine.

Referring more particularly to FIGURE 1 of the drawings, there shown is a wafering machine indicated generally at 10. The wafering mechanism is mounted upon the rear end portion of a frame 12 which is equipped with ground engaging wheels 14 upon which the machine can be drawn through a field of hay or other forage crop. For cutting and comminuting the forage crop the illustrative machine is provided with a rotary flail 16. The flail is disposed adjacent the lower forward portion of the frame 12.

The flail 16 includes a transversely journalled central shaft 18 which mounts a series of blades 19. The outer end of each blade is of arcuate paddle form terminating at its outer end in a cutting edge. The blades 19 are pivoted upon the shaft 18 in longitudinally and angularly spaced relation to the end that upon rotation of the shaft 18 the paths traversed by the paddle-like outer ends of the blades overlap. The flail shaft 18 is rotated in a direction so that the blade tips, in the lower portions of their paths, move in the direction of forward movement of the machine 10. Thus, they engage, cut, and lift the hay as the machine is drawn along a field.

The flail 16 is enclosed within a housing 20 having a generally forwardly projecting hood 20A which serves to prevent forward and outward tossing of the cut forage as it is engaged by the flail blades 19. Desirably the flail shaft 18 and the blades 19 are rotated at realtively high speed so that the blades serve not only to pick up, cut and chop the hay, but by virtue of centrifugal force and fan action to throw the cut and comminuted crop material upwardly and rearwardly within the housing 20.

From the housing 20 the chopped and bruised crop material is received in an upwardly and rearwardly inclined chute 22 wherein co-mingling of the stems and leaves occurs. From the chute 22 the crop material is delivered into a hopper 24 that is disposed transversely upon the rear end portion of the frame 12 beneath the downwardly-directed upper end of the chute 22. From the hopper 24 crop material is transferred into a wafering mechanism which is indicated generally at 26. For this purpose the hopper has disposed therein a cross feed conveyor. As shown the cross feed conveyor includes an auger 28 formed of two helical flights 28a and 28b which are carried by and rotate with a shaft 29. The shaft 29 extends transversely through the hopper.

To drive both the shaft 29 and the flail shaft 18 the wafering machine 10 is equipped with its own power source. In the illustrative machine this power source comprises an internal combustion engine 30. Power from the engine 30 is delivered by way of a transmission 31 and a multiple drive-belt and pulley system 32 to the shafts.

The wafering mechanism 26 includes a housing defining a wafering chamber 34. The housing has an opening 35 in its inner side wall which communicates with the hopper 24 and through which opening the cross feed conveyor 28 delivers the crop material.

The wafering mechanism 26 includes within the chamber 34 means defining a plurality of die cells 36 which are preferably disposed in annular array. The entrance ends of the cells 36 are defined by circumferentially spaced, sharpened tips 38 at the outer ends of which are pivoted longitudinal walls 39 and 40. The walls 39 and 40 are arranged in back-to-back diverging pairs, and means indicated generally at 42 is interposed between each pair for urging the juxtaposed cell wall faces toward each other. Thus the cells 36 are of converging cross section from their entrance ends toward their exit ends. As shown each of the means 42 comprises a pressure fluid actuated piston 43 and cylinder 44 and provision is made for manifolding the cylinders 44 to a common source (not shown) of pressure fluid.

In the present embodiment of the invention three sets of die cells 36 are provided which are arranged in side-by-side longitudinally spaced relation concentrically about the shaft 29. Defining the transverse walls of the die cells 36 are plates 45. The plates 45 are of annular form and together with the inner ends of the sharpened tips 38 define the inner extent of the die cells 36 and thus the limits of an extruder feed chamber 46 of the wafering mechanism 26. It is into the chamber 46 that the comingled and comminuted crop material is delivered by the conveyor 28. Preferably the shaft 29 and the auger conveyor 28 are rotated at a relatively high speed. Such operation imparts a whirling motion to the mass of chopped crop material so that it is distributed, centrifugally, about the periphery of the extruder feed chamber 46. To insure that the crop material is delivered into proximate juxtaposition with the openings or entrance ends of the die cells 36, the auger conveyor 28 is equipped with a pair of vanes 48a and 48b which are respectively fixed to the terminal face portions of the flights 28a and 28b of the auger 28. As shown each of the vanes 28a and 28b is of arcuate form and extends into the chamber 46. Each vane presents a smooth outwardly facing forage-engaging surface generally oppositely disposed to the die cell entrances. Thus as the crop material is impelled into the chamber 46, it is engaged by the vanes and is urged by them toward the periphery of the chamber 46 over the die cell openings.

The wafering mechanism 26 includes means for forcing the crop material that is disposed about the extruder feed chamber 46 and over the entrance ends of the die cells into the die cells and against the sharpened edges of the cell wall tips 38 to sever the hay that is forced into one cell from that in the next adjacent cells. In addition it is contemplated that this means exert sufficient force upon the crop material to express excess moisture therefrom. For this purpose the exemplary machine utilizes a pair of pressure feet or skids 50 of substantial mass.

The pressure feet or skids 50 are carried by a frame 52 which includes diametrically extending arms that are fixed to and rotate with the shaft 29 within the extruder feed chamber 46. The skids 50 are pivoted at 53 adjacent their leading ends and adjacent the outer ends of the arms 52 with their pivotal axes spaced radially inward from the periphery of the extruder feed chamber 46. The outer surfaces of the skids are arcuate being spaced from the periphery of the extruder feed chamber at their leading ends and increasing in radius so as to gradually approach and then extend generally concentric with respect to the periphery of the extruder feed chamber 46 along the trailing portions of their surfaces and in proximate relation to the periphery of the chamber 46.

As shown the frame arms 52 which carry the skids 50 are so oriented about the axis of the shaft 29 that the leading portions of the outer surfaces of the skids 50 are disposed in closely spaced trailing relation to the trailing portions of the outer surfaces of the vanes 48a, 48b that serve to distribute the crop material delivered into the extruder feed chamber about the periphery of the latter. Thus, after the crop material leaves the vanes 48a, it is almost immediately engaged by the leading portions of the outer surfaces of the skids 50 and is wedged outwardly toward the entrance ends of the die cells 36.

To sever crop material between adjacent sets of die cells 36 the outer surfaces of the skids are equipped with cutting ribs 54 for cooperation with the central ones of the side plates 45. Thus the ribs 54 are correspondingly spaced and are of triangular cross-section increasing in altitude, i.e. of increasing radial extent beyond the outer surfaces of the respective skids, so as to define a shearing edge 54a. The ribs 54 are of limited peripheral extent. To assist in clearing the crop material the ribs 54 terminate abruptly at their trailing ends and are succeeded by correspondingly disposed and spaced grooves 55 which are of gradually decreasing depth from their leading ends toward their trailing ends.

Figure 2:
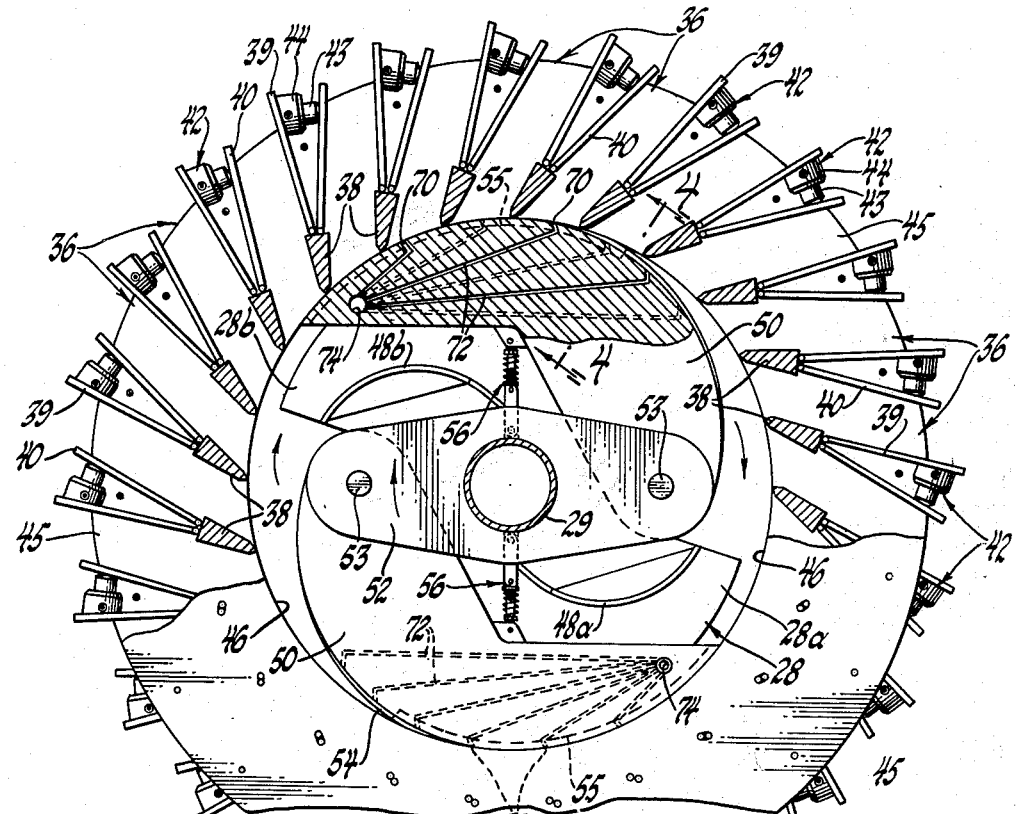
FIG. 2 is a fragmentary, longitudinal sectional view taken through the wafering mechanism substantially in the plane of line 2—2 in FIGURE 1.
Figure 3:
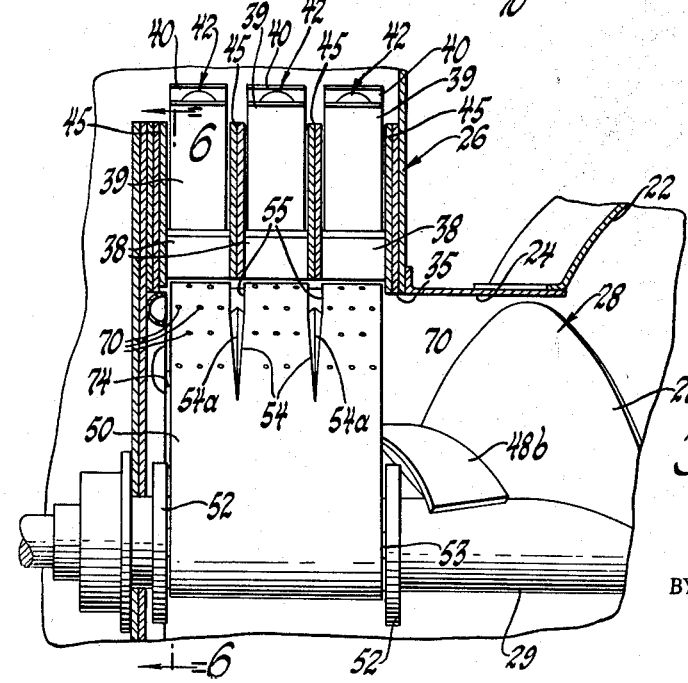
FIG. 3 is a fragmentary transverse section taken substantially in the plane of line 3—3 of FIGURE 1.
Figure 4:
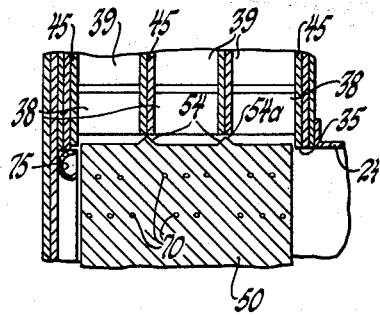
FIG. 4 is a fragmentary sectional view taken substantially in the plane of line 4—4 in FIG. 2.
Figure 5:
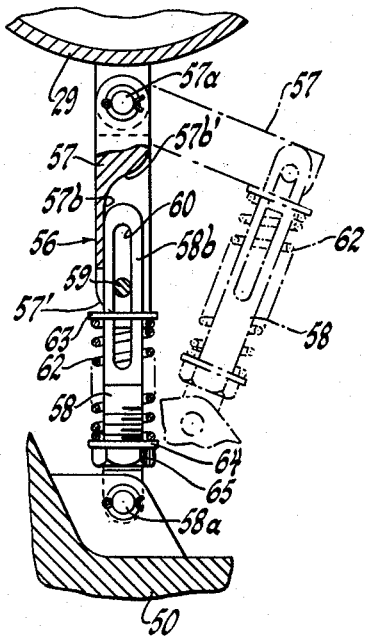
FIG. 5 is a fragmentary sectional view illustrating exemplary means for urging the pressing shoes or skids into crop-engaging position.
Figure 6:
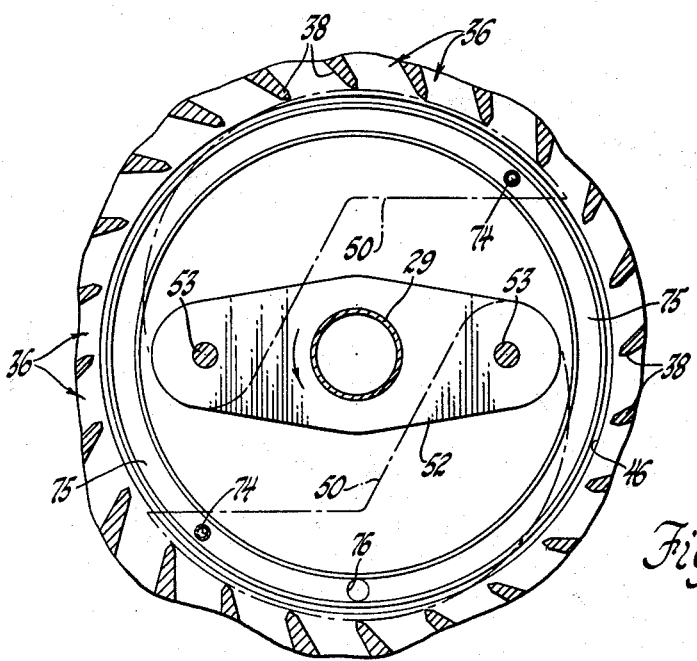
FIG. 6 is a fragmentary sectional view taken substantially in the plane of line 6—6 in FIG. 3.

Means are provided for normally maintaining the skids in an extended operative position within the chamber 46. As shown this means includes a spring-biased arm 56 interposed between the shaft 29 and each of the skids 50. Each of the arms 56 is formed of a pair of links 57 and 58, the outer ends of which are respectively pivoted, at 57a and 58a, to the shaft 29 and to one of the skids 50 (FIGS. 2 and 5). The link 58 terminates in a tongue 58b which is received in a transaxially disposed groove 57b in the link 57. The latter mounts a pin 59 which is received in an elongated slot 60 formed in the link 58. The tongue-in-groove and pin-in-slot interconnection between the arm links 57 and 58 permits guided telescoping movement therebetween.

To resiliently extend the arm 56 an expansion type spring 62 is provided. The spring is disposed about the link 58 and acts in expansion between washers 63 and 64. The washer 63 bears against the outer end of the arm link 57, and the washer 64 abuts a spring-tension adjusting nut 65 which is threaded upon the link 58 near its outer end where it is pivotally connected to the skid 50. The spring 62, acting to extend the arm 56, normally biases the associated skid 50 into crop-engaging position toward the periphery of the extruder feed chamber 46. Yet its resilience permits contraction of the arm and subsequent extension thereof, with restoration of skid position, as variations in quantity and density of crop material are encountered.

Provision is also made for overload release of the skids 50 to minimize damage that might occur if an obstruction, a stray stone, for example, is encountered. Further, the construction and arrangement is such that a skid is maintained in released position until the obstruction is cleared and repositioning, or resetting, is effected. To this end the connection between the links 57 and 58 of each of the arms 56 is arranged to jackknife if more than ordinary telescoping movement occurs therebetween. As seen in FIG. 5, the right side of the groove 57b opens laterally, and adjacent the outer end of the link 57, the left end wall of the groove terminates short of the pin 59. The groove is thus open for the passage of the tongue 58b of the arm link 58. Further, the free end of the tongue 58 is rounded for engagement with the outwardly directed inner end surface 57b' of the groove 57b. Similarly the outer end of the link 57 is rounded at 57' so that it can ride upon the washer 63. It will be seen, then, that as the arm links 57 and 58 telescope together, the rounded outer end of the link 58 engages the groove surface 57b' and is cammed toward the right about the pin 59. Similarly the washer 63 rides along the rounded outer end 57' of the link 57. As a result the links 57 and 58 move angularly with respect to each other thereby effectively shortening the arm 56, drawing the pivot 58a inward. As the arm 56 is effectively shortened, the associated skid 50 is swung about its pivot 53 in a counterclockwise direction, as seen in FIG. 2, and the outer surface of the skid is drawn inwardly of the extruder feed chamber 46 away from its periphery.

As the relative angular movement between the arm links 57 and 58 continues so, too, relative movement continues between the washer 63 and the link end 57'. It will be seen (FIG. 5) that when this latter movement has traversed an angle slightly greater than 45° then the spring 62 forces the washer 63 laterally against the link 57 tending to increase the jackknifing movement. When that movement has traversed approximately 90°, so that the spring force is applied substantially entirely laterally upon the end of the link 57, the arm 56 is effectively restrained in an angular, jackknifed condition. The result is that the associated skid 50 is held in withdrawn position. This facilitates clearing the obstruction which caused the jackknifing, and when that has been accomplished the arm can be reset into straight extended condition and normal operation resumed.

It is apparent that with rapid rotation of the shaft 29 and the very considerable mass of the skids 50, the skids are urged outwardly under the action of centrifugal force, primarily, and under the action of the spring 62, when the arms 56 are in the normal position, to the end that the skids exert great force upon the crop material distributed about the extruder feed chamber 46. Since it is contemplated that the instant invention be incorporated in a machine for wafering crop material of high moisture content, the compacting forces exerted by the skids 50 upon the comminuted and bruised crop material that is distributed about the extruder feed chamber 46 causes excess juices to be squeezed from the material. Provision is made for collecting and conveying away the juices. To this end each of the skids is provided with a series of moisture entrance ports 70 which open from the outer, crop-material-engaging surfaces of the skids 50. The ports 70 of each skid are connected by transverse fluid passages 72 to a common longitudinally disposed manifold 74 that extends through the skid adjacent the trailing end portion thereof. The ports 70, as can best be seen in FIG. 2, are angled rearwardly, or oppositely, with respect to the direction of rotation of the skids within the extruder feed chamber 46 so as to prevent crop material from entering the same and to assist in the wiping off of any crop material that might hang at and tend to clog the ports. Moisture pressed from the crop material can enter the ports 70, and from them the moisture is conducted from the ports by way of the passages 72 to the manifold 74. To convey away such moisture the manifold 74 is arranged to discharge into a trough 75. The trough 75, as shown, is in the form of a ring of generally semi-circular cross-section opening toward the extruder feed chamber 46. The trough is fixed in position so as to be oppositely disposed to the discharge ends of the manifolds 74 whereby to receive moisture therefrom. It is also contemplated that juices that might flow about the sides of the compacting skids 50 also find their way into the trough 75.

A drain opening 76 is provided at the bottom of the trough 75 for the discharge of moisture therefrom. Such moisture as may be collected in and discharged from the trough 75 by way of the discharge opening 76 can be collected for subsequent use as by the provision of a suitable connection (not shown) between the discharge opening 76 and a tank 77 carried upon the machine frame 12, or such moisture can be otherwise disposed of as may be desired.

From the foregoing, therefore, it will be seen that a wafering machine embodying the present invention incorporates a wafering mechanism which includes, as pressing means, compacting shoes or skids for engaging comminuted and bruised crop material delivered to the wafering mechanism and by the operation thereof is capable of expressing excess moisture from the crop-material and at the same time forcing the material, upon subsequent passes of the skids, into and through the die cells of the mechanism to form it into compact wafers. Thus a machine incorporating the teachings of the present invention permits of utilization for wafering hay or other forage crop of high moisture content such for example as would be encountered in harvesting a standing crop. Further, the improved wafering mechanism is of increased capacity as compared with prior devices as a result of the provision of multiple annular arrays of die cells. In addition the invention teaches the provision for overload release in the event that an obstruction is encountered to the end of minimizing damage if that should eventuate.

I claim as my invention:

1. In a wafering mechanism for a machine for compacting forage crop material into wafers which includes means for delivering crop material to the mechanism, the combination comprising a plurality of die cells arranged in multiple annular arrays disposed in coaxial side-by-side relation and defining an extruder feed chamber interiorly of said arrays for receiving crop material delivered into the mechanism, a power-driven shaft extending into said chamber, a pair of skids, means for pivotally connecting the leading ends of said skids in diametrically spaced relation within said chamber and in spaced relation to said shaft axis for rotation with said shaft within said chamber, said skids having arcuate outer surfaces with the trailing portions of said surfaces fashioned for and normally disposed in crop-engaging position proximate the entrance ends of the die cells of said annular arrays and having fixed ribs upon said outer surfaces defining shearing edges for severing crop material between adjacent arrays of die cells, said outer surfaces having moisture entrance ports therein for receiving moisture expressed from the crop material upon its traversal by said skids, and means communicating with said ports for conveying away said moisture.

2. The combination according to claim 1 wherein said last mentioned means includes in each of said skids a manifold and a plurality of passages communicating between said ports and said manifold and including a trough fixed with respect to said die cell arrays for receiving and conveying away moisture from said skid manifolds conducted thereto by said passages from said ports and from said chamber.

3. In a wafering mechanism for a machine for compacting forage crop material into wafers including means for delivering crop material to the mechanism, the combination comprising, multiple arrays of die cells which arrays are arranged in side-by-side relation, each of said arrays being of annular form and said arrays being arranged in coaxial longitudinally spaced relation to each other so as to define an extruder feed chamber for receiving the crop material delivered to the wafering mechanism, compacting means including a skid mounted for rotation within said chamber so that its outer surface traverses a path over the entrance ends of the die cells of said arrays with the trailing portion of said surface in proximate relation thereto, means for moving said skid in frictional engagement with crop material over the entrance ends of the cells in said arrays for expressing moisture from the crop material and compacting the material into and through said cells, and a plurality of circumferentially spaced sharpened tips defining the entrance ends of the die cells of each of said annular arrays, said tips being inclined in the direction of rotational movement of said skid at an acute angle to the radii of said annular arrays.

4. In a wafering mechanism for a machine for compacting forage crop material into wafers including means for delivering crop material to the mechanism, the combination comprising, multiple arrays of die cells which arrays are arranged in side-by-side relation, each of said arrays being of annular form and said arrays being arranged in coaxial longitudinally spaced relation to each other so as to define an extruder feed chamber for receiving the crop material delivered to the wafering mechanism, compacting means including a skid mounted for rotation within said chamber so that its outer surface traverses a path over the entrance ends of the die cells of said arrays with the trailing portion of said surface in proximate relation thereto, means for moving said skid in frictional engagement with crop material over the entrance ends of the cells in said arrays for expressing moisture from the crop material and compacting the material into and through said cells, and means on said outer surface of said skid for severing crop material between said adjacent arrays of the die cells.

5. The combination according to claim 4 wherein said last named means includes wedge-shaped ribs defining shearing edges on the outer surface of said skid.

6. In a wafering mechanism for a machine for compacting forage crop material into wafers including means for delivering crop material to the mechanism, the combination comprising multiple arrays of die cells which arrays are arranged in side-by-side relation, each of said arrays being of annular form and said arrays being arranged in coaxial longitudinally spaced relation to each other so as to define an extruder feed chamber for receiving the crop material delivered to the wafering mechanism, a rotatable shaft coaxially disposed in said chamber, compacting means including a skid pivotally connected adjacent one end thereof to said shaft in spaced relation to the axis of said shaft for rotation therewith within said chamber, a resilient arm interposed between said shaft and said skid normally urging said skid into crop-engaging position with respect to the entrance ends of the die cells, and means for rotating said skid in frictional engagement with crop material over the entrance ends of the cells in said arrays for expressing moisture from the crop material and compacting the material into and through said cells.

7. The combination according to claim 6 wherein said arm interposed between said shaft and said skid includes means for releasing said skid from normal operating position when overload is encountered.

8. The combination according to claim 6 wherein said arm includes a pair of links having a connection therebetween for relative telescoping movement as said skid varies normally in position with respect to the entrance ends of the die cells according to the condition of crop material traversed by said skid, said connection effecting release of said skid from its normal operating position when overload is encountered.

9. The combination according to claim 8 wherein said arm includes a spring interposed between said links normally urging the same so as to extend said arm for urging said skid toward crop-engaging position, and a pivotal connection between said links for jackknifing movement therebetween so as to effect release of the skid from crop-engaging position upon encountering an overload condition.

10. The combination according to claim 9 wherein said arm includes means for restraining said links in jackknifed condition after said skid encounters overload.

11. In a wafering mechanism for a machine for compacting forage crop material into wafers including means for delivering crop material to the mechanism, the combination comprising, multiple arrays of die cells which arrays are arranged in side-by-side relation, each of said arrays being of annular form and said arrays being arranged in coaxial longitudinally spaced relation to each other so as to define an extruder feed chamber for receiving the crop material delivered to the wafering mechanism, compacting means including a skid mounted for rotation within said chamber so that its outer surface traverses a path over the entrance ends of the die cells of said arrays with the trailing portion of said surface in proximate relation thereto, means for moving said skid in frictional engagement with crop material over the entrance ends of the cells in said arrays for expressing moisture from the crop material and compacting the material into and through said cells, said outer surface of said skid formed to define a plurality of moisture entrance ports for receiving moisture expressed from the crop material, and passages communicating with said ports for conveying away said moisture therefrom.

12. The combination according to claim 11 wherein said ports are angled rearwardly with respect to the direction of movement of said skid over the entrance of the die cells.

13. The combination according to claim 11 including a manifold connected to said passages, and means including a trough is provided for receiving and conveying away moisture from said manifold.

References Cited by the Examiner

UNITED STATES PATENTS

| | | | |
|---|---|---|---|
| 1,804,283 | 5/31 | Sizer | 107—8.35 |
| 1,848,332 | 3/32 | Estes | 100 |
| 2,063,404 | 12/36 | Selman | 100 |
| 2,160,302 | 5/39 | Billows | 107—8.35 |
| 2,171,039 | 8/39 | Meakin | 100 |
| 2,565,830 | 8/51 | Weston | 107—14 |
| 2,647,474 | 8/53 | Popick | 18—12 |
| 3,000,294 | 9/61 | Lowe et al. | 100—121 |
| 3,045,613 | 7/62 | Kennedy | 18—12 |

FOREIGN PATENTS

| | | |
|---|---|---|
| 196,947 | 5/23 | Great Britain. |
| 1,029,069 | 3/53 | France. |
| 770,664 | 3/57 | Great Britain. |
| 1,250,174 | 11/60 | France. |

WALTER A. SCHEEL, *Primary Examiner.*